Sept. 10, 1929.   C. SAUZEDDE   1,727,486
BRAKE DRUM
Original Filed June 14, 1926

Inventor
Claude Sauzedde,
By
Attorneys

Patented Sept. 10, 1929.

1,727,486

UNITED STATES PATENT OFFICE.

CLAUDE SAUZEDDE, OF DETROIT, MICHIGAN.

BRAKE DRUM.

Original application filed June 14, 1926, Serial No. 115,779. Divided and this application filed June 16, 1927. Serial No. 199,179.

The present invention pertains to a novel brake drum of the type engaged interiorly by brake shoes when it is desired to slow down or stop the device to which the brake is applied. The brake drum disclosed herein may be used for braking purposes in general but is intended particularly for use in connection with the wheels of automobiles or aeroplanes as shown in my co-pending application Serial No. 115,779, filed June 14, 1926, of which the present application is a division.

The principal object of the invention is to provide a brake drum of light material, such as aluminum, having high heat-dissipating properties and fitted with a lining of more indurate material to be engaged by the brake shoes. The rate of heat dissipation is enhanced by the provision of ribs formed radially and peripherally on the exterior of the drum. Further, the area of contact between the lining and the drum is of a threaded or serrated nature, whereby heat is transmitted from the lining, where it is generated, to the body of the drum at a greater rate than is ordinarily expected.

Figure 1:
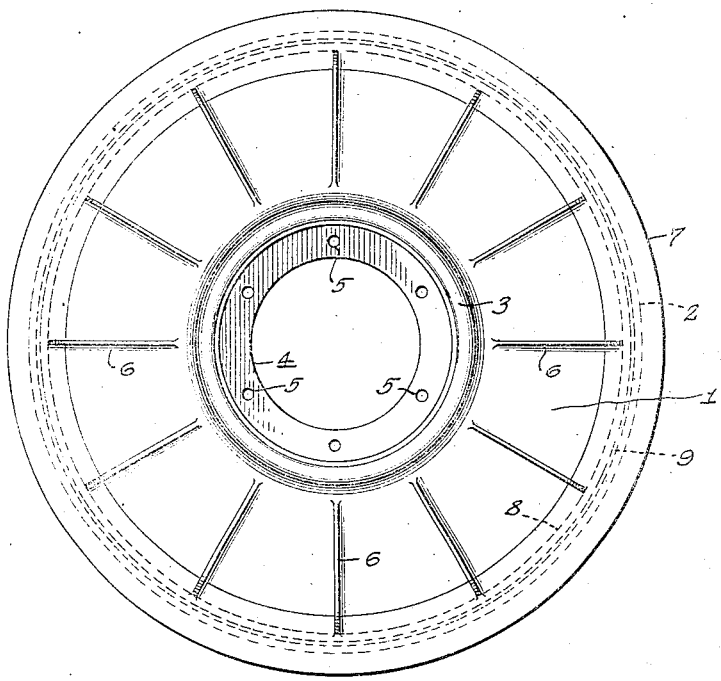
Figure 2:
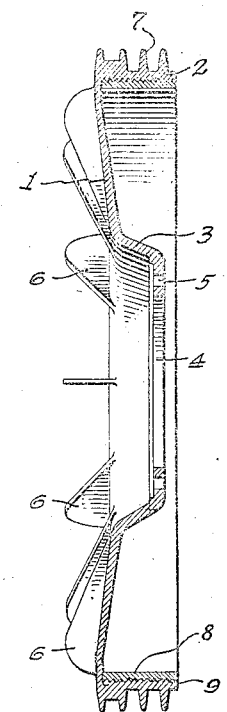

The invention is fully disclosed by way of example in the following description and in the accompanying drawings in which Figure 1 is an elevation of the device, and Fig. 2 is a transverse section thereof.

Reference to these views will now be made by use of like characters which are employed to designate corresponding parts throughout.

The brake drum is built upon a simple plate 1 having a marginal flange 2. The center of the plate is depressed as at 3 and formed with an opening 4 adapted to receive the rotatable wheel hub of a vehicle. Around the opening 4 are formed apertures 5 for accommodating fastening elements securing the plate to said hub.

On the outer surface of the plate 1 are formed spaced radial ribs 6 which decrease in depth from the outer end to the inner end thereof. These ribs extend oppositely to the flange 2.

The flange is formed on its outer surface with circular or peripheral ribs 7. Into the flange is cast a liner 8 of more indurate metal, particularly when the integral parts 1, 2, 6 and 7 are of aluminum. The liner thus becomes substantially integral with the flange. This liner may be of steel or other metal which is better suited than the body metal to receive the wear caused by the usual brake shoes provided inside of the drum. The inner surface of the flange is serrated or threaded so that a serrated surface 9 is formed between the flange and liner. This surface has approximately twice the area of a regular cylindrical surface in the same region, and consequently the area of contact between the parts 8 and 2 and the rate of heat radiation therebetween is considerably increased. The ribs 7 assist materially in dissipating the heat delivered to the body of the flange 2, and such heat that may be conducted to the plate 1 is similarly dissipated through radial ribs 6. Both sets of ribs operate on the principle of distributing the heat over a comparatively large area in contact with the air, whereby such heat is rapidly absorbed by the air.

Although a specific embodiment of the invention has been illustrated and described, it will be apparent that various alterations in the details of construction may be made without departing from the scope of the invention as indicated by the appended claims.

What I claim is—

1. A brake drum having a wear lining, the surface of contact between said lining and drum being of a serrated nature for the purpose described.

2. A brake drum having a wear lining of more indurate material than the drum, the surface of contact between said lining and drum being of a serrated nature for the purpose described.

3. A brake drum having exterior heat-radiating ribs, and a lining of more indurate material provided in said drum, the surface of contact between said lining and drum being of a serrated nature for the purpose described.

In testimony whereof I affix my signature.

CLAUDE SAUZEDDE.